CHARLES F. CARR.

Improvement in Apparatus for Preserving Meat.

No. 125,540. Patented April 9, 1872.

Witnesses.
C. H. Poole
John R. Young

Inventor,
C. F. Carr, by
Prindle and Co., his
attys.

125,540

UNITED STATES PATENT OFFICE.

CHARLES F. CARR, OF NORWICH, NEW YORK.

IMPROVEMENT IN APPARATUS FOR PRESERVING MEAT.

Specification forming part of Letters Patent No. 125,540, dated April 9, 1872.

*To all whom it may concern:*

Be it known that I, CHAS. F. CARR, of Norwich, in the county of Chenango and State of New York, have invented certain new and useful Improvements in Apparatus for Preserving Meats; and do hereby declare that the following is a full, clear, and exact description thereof, reference being had to the accompanying drawing making a part of this specification, in which—

Figure 1:
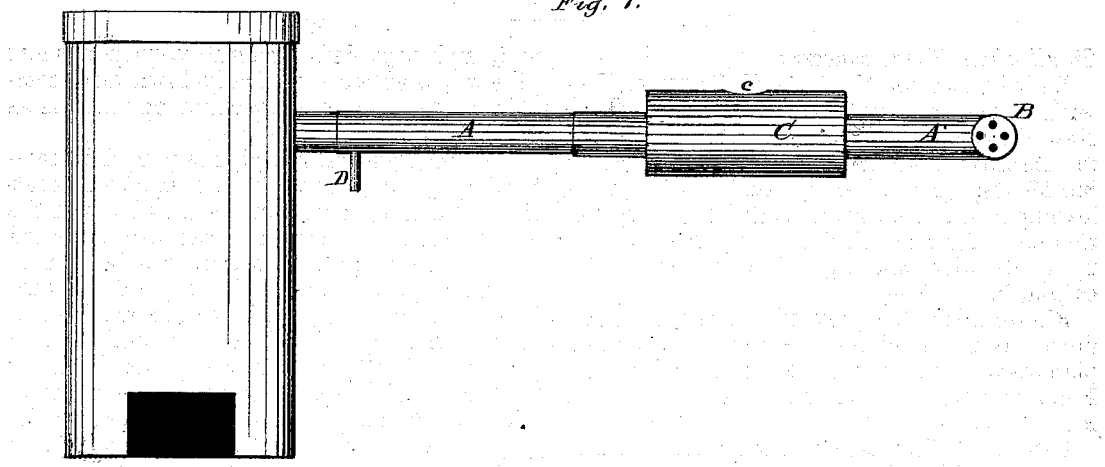
Figure 2:
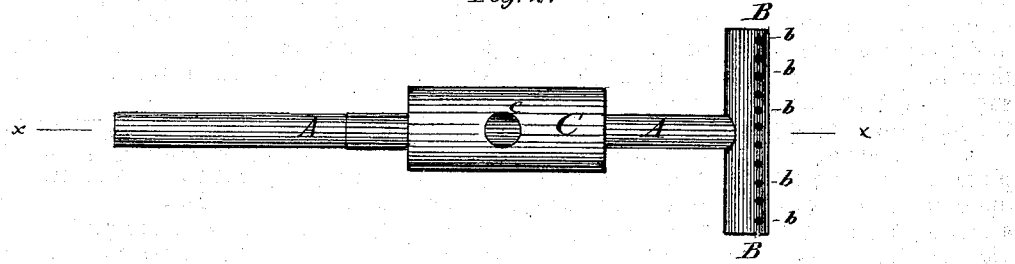
Figure 3:
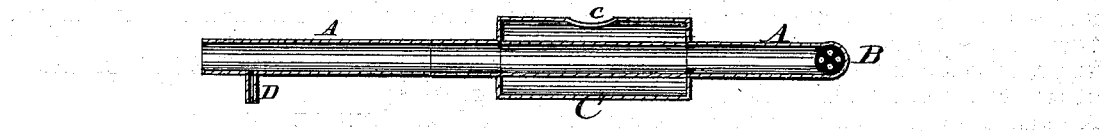

Figure 1 is a side elevation of my improved device as arranged for operation. Fig. 2 is a plan view of the upper side of the same; and Fig. 3 is a central longitudinal section on line *x x* of Fig. 2.

Letters of like name and kind refer to like parts in each of the figures.

My invention is an improvement in the means employed for smoke-curing meat; and it consists, principally, in a water-chamber surrounding the pipe or duct through which smoke is supplied to the apartment or receptacle for containing the meat, substantially and for the purpose hereinafter specified. It consists, further, in the drip-opening within the smoke-supply pipe or duct, substantially as and for the purpose hereinafter shown.

In the annexed drawing, A represents a metal plate having, preferably, a cylindrical form, upon one end of which is secured horizontally a cross-pipe, B, inclosed at its ends, and provided with a series of perforations, *b*. Around the pipe A near the cross-pipe is secured a metal cylinder, C, (having about twice the diameter of said pipe,) the ends of which are inclosed so as to form a water-tight joint between the same and said pipe A. An opening, *c*, provided in and through the upper side of said cylinder, affords access to its interior. A small opening, D, formed in and through the lower side of the pipe A, near its open end, and provided, preferably, with a short pipe which extends vertically downward, completes the device, the operation of which is as follows:

The open end of the pipe is placed in communication with any suitable smoke-generating apparatus, and its inclosed end within the apartment containing the meat to be operated upon, the cylinder C being outside of said apartment, and said pipe having a downward inclination from the same to the smoke-generator. The cylinder C being now filled with cold water, the smoke is cooled as it passes through the pipe so as to enable its curative properties to be employed without the usual injury which results from the heat conveyed by it to the curing apartment.

The sudden cooling of the smoke causes the production of creosote, which, if pemitted to pass into the smoke-generator, would create much annoyance, but which, by means of the opening D, escapes harmlessly from the pipe A before reaching said generator.

Having thus fully set forth the nature and merits of my invention, what I claim as new is—

1. A reservoir for containing water, arranged upon or around the smoke-pipe or duct of a meat-curing apparatus, substantially as and for the purpose specified.

2. In combination with the pipe A, provided with the water-jacket or reservoir C, the opening D, substantially as and for the purpose shown.

In testimony that I claim the foregoing I have hereunto set my hand this 6th day of February, 1872.

CHARLES F. CARR.

Witnesses:
R. B. PRINDLE,
JAMES W. GLOVER.